Oct. 6, 1959
E. D. SCOTT
2,907,371
ADJUSTABLE SEAT TRACK ASSEMBLY
Filed April 26, 1954
2 Sheets-Sheet 1
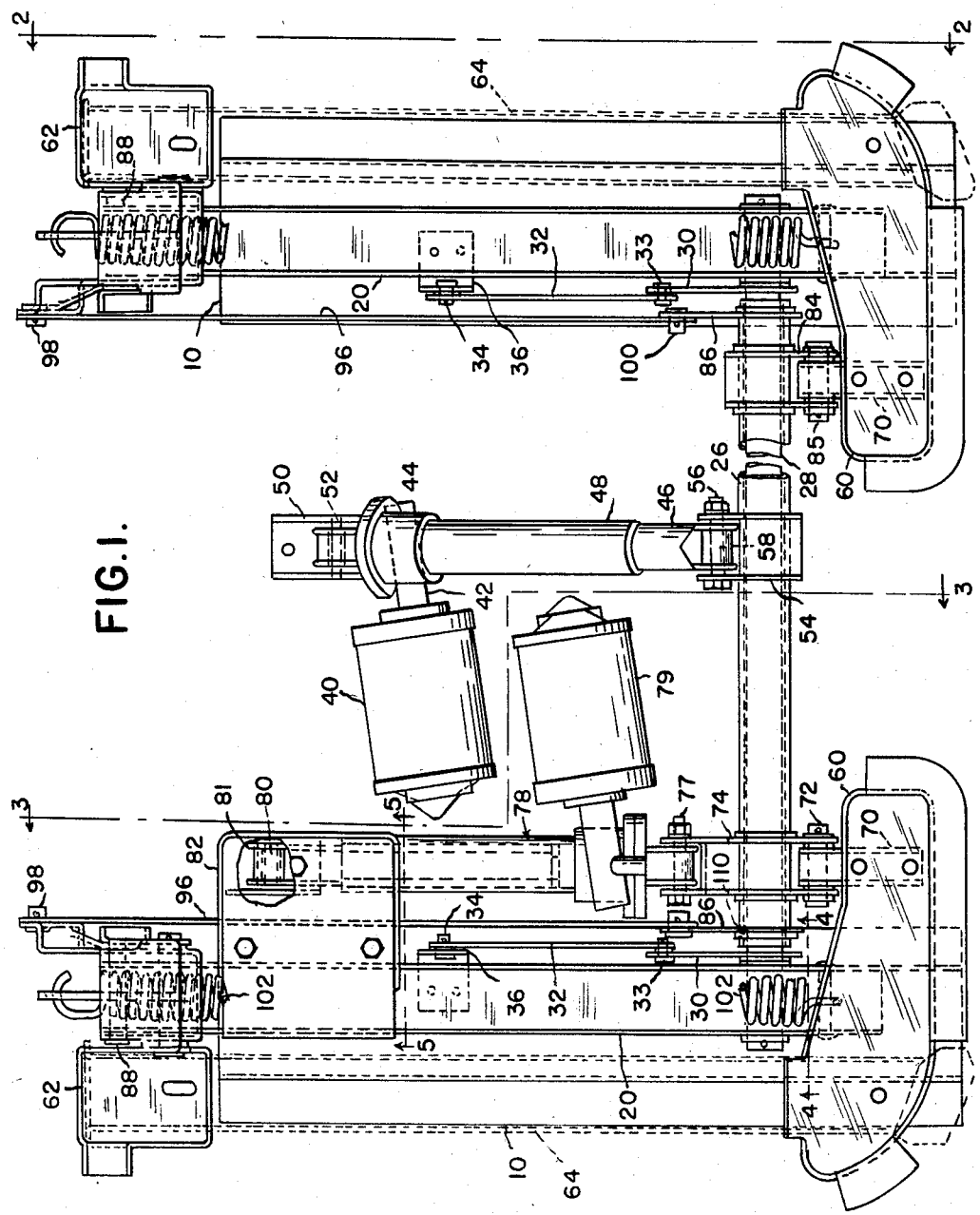
INVENTOR.
EDWIN D. SCOTT
BY
*Whittemore, Hulbert & Belknap*
ATTORNEYS Oct. 6, 1959        E. D. SCOTT        2,907,371
ADJUSTABLE SEAT TRACK ASSEMBLY
Filed April 26, 1954        2 Sheets-Sheet 2
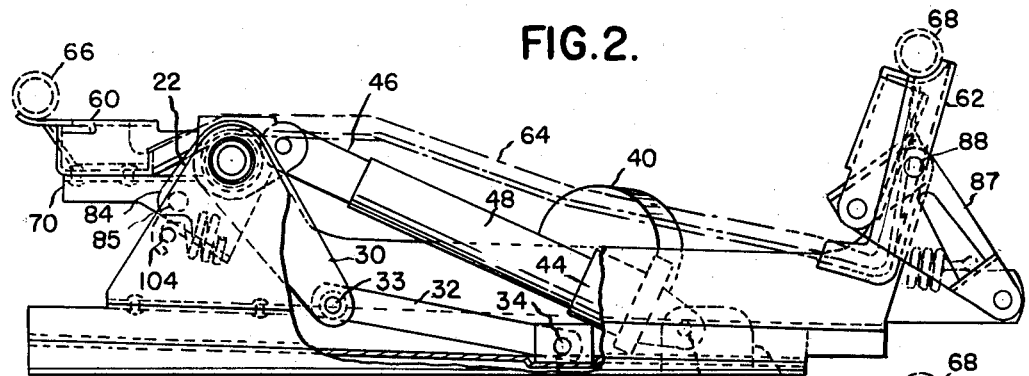
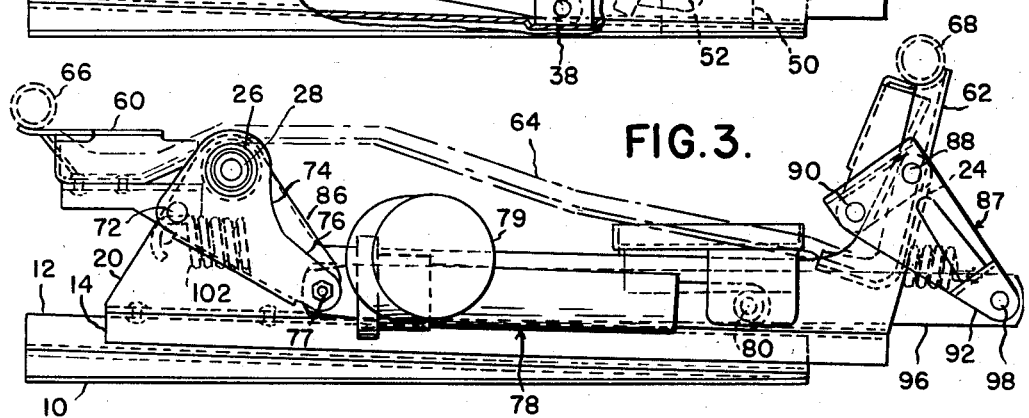
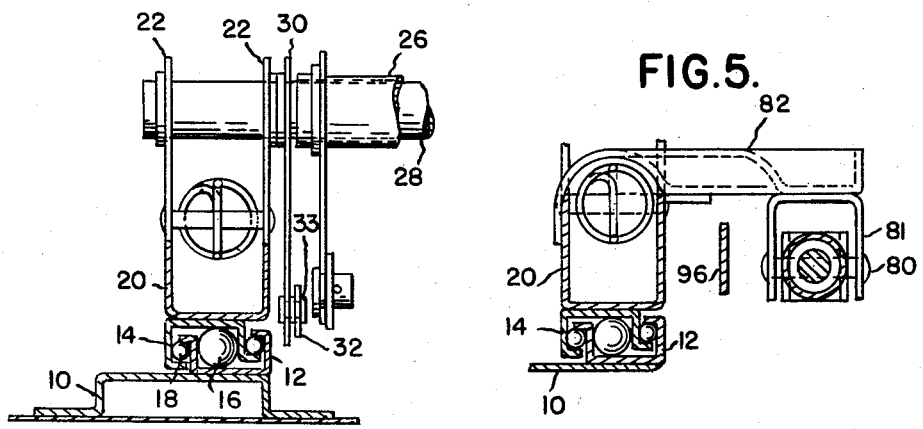
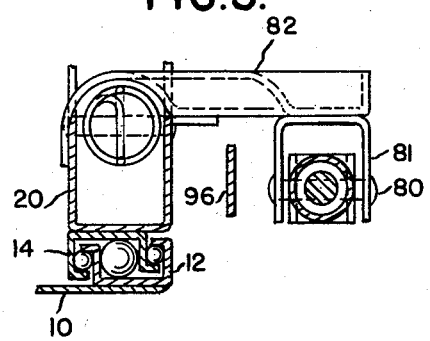
INVENTOR.
EDWIN D. SCOTT
BY
ATTORNEY

# United States Patent Office 2,907,371
Patented Oct. 6, 1959

2,907,371

ADJUSTABLE SEAT TRACK ASSEMBLY

Edwin D. Scott, Plymouth, Mich., assignor to American Forging & Socket Company, Pontiac, Mich., a corporation of Michigan Application April 26, 1954, Serial No. 425,501

19 Claims. (Cl. 155—14)

The present invention relates to vehicle seats and more particularly to vehicle seats of the adjustable type.

In accordance with the present invention selective means are provided for effecting both vertical and horizontal adjustment so that the driver may select the most comfortable location for the seat in which he has proper clearance below and behind the steering wheel and has the most advantageous eye level for safe driving. The selective adjustment of the seat to the desired position may be accomplished either by manual means or by power means.

In general, the front to rear adjustment is accomplished by means of cooperating slide assemblies, one at each side of the vehicle seat and intersected by a cross structure which ties the right side to the left side in the desired width. Attached to the cross structure at opposite ends thereof are bell cranks and links effective to insure equal parallel motion between the right and left slide assemblies as the seat is moved horizontally. The vertical adjustment is accomplished by means of bell cranks connected to the seat frame supporting structure and to a cross tie structure through a pivotal motion about the last mentioned cross tie structure. Similar bell cranks are provided at the four corners of the seat supporting structure, those at each side of the seat supporting structure being interconnected by a link insuring equal motion thereof, and equal motion at opposite ends of the seat being insured by the cross tie thereof.

With the foregoing general remarks in mind, it is an object of the present invention to provide a mounting for an adjustable vehicle seat which is simplified in construction and inexpensive to manufacture, yet which achieves the desired result of rigidly supporting the seat, permits easy adjustment of the seat horizontally or vertically in the vehicle, and insures equal simultaneous movement of the opposite sides of the seat during both the vertical and horizontal adjustment thereof.

It is a further object of the present invention to provide a vehicle seat as described in the preceding paragraph comprising fixed tracks secured to the floor of the vehicle, slides on the tracks movable generally horizontally from front to rear of the vehicle, said tracks having upwardly extending brackets, seat supporting lever means on each of said brackets, links interconnecting the lever means at each side of the seat structure, and tie means interconnecting the slides at opposite ends of the seat, said tie means being located substantially above the top of the slides to provide clearance therebeneath.

It is a feature of the present invention to provide vertically and horizontally adjustable seat supporting structures at opposite sides of a vehicle seat including tie means extending longitudinally of the seat for insuring equal and simultaneous movement of both sides of the seat, said tie means comprising rotatable shaft members.

It is a further feature of the present invention to provide a structure as described in the preceding paragraph in which said tie means comprises a first tubular shaft member operable to control a selected one of the two adjustments provided for the seat structure, and a second shaft received within the first shaft and relatively rotatable therein for controlling the other one of the two adjustments.

It is a further feature of the present invention to provide power means for effecting the adjustment of the vehicle seat.

It is a further feature of the present invention to provide cross tie structure located in elevated position above the floor of the vehicle which facilitates installation and is not likely to become fouled with dirt or foreign matter.

Other objects and features of the invention will become apparent as the description proceeds, especially when taken in conjunction with the accompanying drawings, wherein:

Figure 1 is a plan view of the adjustable seat supporting structure with the seat removed for clarity.

Figure 2 is an end view of the structure shown in Figure 1 as seen from the right, with parts broken away.

Figure 3 is a sectional view on the line 3—3, Figure 1, with parts broken away.

Figure 4 is a section on the line 4—4, Figure 1.

Figure 5 is a section on the line 5—5, Figure 1.

Referring first to Figure 4, the seat construction comprises a lower track spacer 10 provided at each side of the vehicle and rigidly secured to each of the track spacers is an elongated lower track member 12. Slidable longitudinally relative to each of the lower track members 12 is an elongated slide 14. Suitable anti-friction means such as the balls 16 and 18 are provided so that the slide 14 moves with substantial freedom longitudinally of the fixed track 12. Fixedly secured to the slides 14 are generally elongated channel shaped brackets 20 having at the forward ends thereof vertical upwardly extending laterally spaced post portions 22. At the rear ends of the brackets 20 are provided laterally spaced pairs of post portions 24.

Means for effecting horizontal front to rear adjustment of the seat construction will be described first and comprises the outer tubular cross tie shaft 26 which is rotatably supported on the inner cross tie shaft 28 which may also be tubular. The inner cross tie shaft extends through and pivotally supported by openings in the forward post portions 22 of the elongated brackets 20. Accordingly, horizontal forces applied in a fore and aft direction to the outer tubular cross shaft 26 are applied directly to the elongated brackets 20 upon which the vehicle seat is carried.

It is necessary to insure equal simultaneous movement of both of the slides 14 and for this purpose the inner cross shaft 28 has rigidly connected thereto arms 30 to the free ends of which are pivotally connected equalizer links 32, the pivot connection being illustrated by pivot pins 33. The other ends of the equalizer links 32 are connected by pivot means 34 to brackets 36. The brackets 36 have generally horizontally extending flanges rigidly secured to seats 38 provided therefor in the upper surface of the lower track spacer 10.

Accordingly, when a force is applied to the cross tie shaft including the tubular shaft 26 and the inner shaft 28, these forces are applied directly to the elongated brackets 20 and thence to the longitudinal slides 14. However, any fore and aft movement of the elongated brackets 20 causes rotation of the inner cross shaft 28 through the action of the levers 30 and links 32, thereby assuring equal and simultaneous uniform movement of the tracks at the opposite ends of the vehicle seat.

While the fore and aft adjustment of the seat may be accomplished by manual means, this adjustment is preferably carried out by power means. For this purpose a motor 40 is provided having an output shaft included within a housing 42, the shaft being provided with a worm operatively associated with a worm gear contained in a second housing 44. Internally, the worm gear is formed with screw threads and operates as a nut on a power screw 46 which is preferably provided with a plastic protective cover 48. Preferably, to reduce friction losses, the nut is of the captive ball type. The screw and nut structure is mounted on a bracket 50 which is secured to the vehicle floor, the connection between the bracket 50 and the screw and nut combination being effected by a pivot pin indicated at 52. While reference has been made to a screw and nut combination for effecting horizontal fore and aft movement of the seat, any suitable power means could be substituted therefor.

At its forward end the power screw 46 is connected to a bracket 54 welded or otherwise secured to the outer tubular shaft 26, a pivot connection being provided between the bracket and the power screw as indicated by the bolt 56, the shank of which constitutes a pivot pin 58. It will be appreciated that if preferred the power screw 46 could be connected to the outer tubular cross shaft 26 by a collar or the like rotatble on the outer tubular cross shaft, so that rotation of the outer tubular cross shaft by means later to be described, will not disturb the relationship between the outer cross shaft and the power screw 46.

With the construction as so far described it will be apparent that forward or reverse energization of the motor 40 will advance or retract the power screw 46 and accordingly effect a corresponding advance or retraction of the cross shaft structure. This is caused to effect equal simultaneous uniform movement of the tracks at opposite ends of the vehicle seat, this movement being insured by the inner cross shaft 28, the arms 30, and the links 32.

In order to provide for selective vertical adjustment of the seat, seat supporting front corner brackets 60 and rear seat supporting corner brackets 62 are provided. The seat, the outline of which is shown in dotted lines in Figures 2 and 3, is secured to the brackets. In these figures a seat strainer construction 64 is illustrated as well as tubular elements 66 and 68 of the seat construction. The front corner brackets 60 have depending therefrom channel shaped members 70, the webs of which are apertured to receive pivot pins 72. The pivot pins 72 afford a pivotal connection between the right hand corner supporting brackets 60 and the bell crank 74 which is rigidly secured to the outer tubular cross shaft 26 adjacent the right hand end thereof. The bell crank 74 includes a downwardly and rearwardly extending arm 76 pivotally connected as by a pivot pin 77 to power actuating means indicated generally at 78 driven by power means including a motor 79. It will be understood that the actuating means 78 may be identical with the power means for advancing the power screw 46. Alternatively, any suitable power means may be employed.

The rear end of the actuating means 78 is connected by a pivot pin 80 to a channel shaped extension 81 of a bracket plate 82 rigidly secured to the elongated seat supporting bracket 20 at the right side of the construction, as best illustrated in Figure 5. Accordingly, front to rear adjustment of the seat carries with it the vertical adjustment structure in its entirety so that front to rear adjustment is made completely independent of vertical adjustment.

At the left hand end of the cross structure the outer tubular cross shaft 26 is provided with an arm 84 pivotally connected to the channel shaped member 70 at the left hand corner seat supporting bracket 60 by means of a pivot pin 85.

Also connected to the outer tubular cross shaft 26 are parallel arms 86.

The rear corner supporting brackets 62 are pivotally connected to bell cranks 87 mounted on rear corner posts 24 by pivot pins 88. The pivot connection between the bell cranks 87 and the brackets 62 is provided by the pivot pins 90. The bell cranks 87 include downwardly and rearwardly extending arms 92 parallel to the arms 86, and the arms 86 and 92 are interconnected by parallel links 96, pivot pins 98 being provided at the rear of the parallel links 96 and pivot pins 100 being provided at the front thereof.

The arms defined by the axis of the cross shafts and the pivot pins 85 and 72 are equal to the arms defined by the pivot pins 88 and 90, and the arms defined between the axis of the cross shaft and the pivot means 100 are equal to the arms defined between the axis of the pivot pins 88 and 98. Accordingly, a parallelogram is provided and upon rotation of the outer cross shaft 26 by the application of power to the bell crank 74 all of the four corner supporting brackets are swung upwardly or downwardly in equal parallel arcs to effect uniform vertical adjustment of the vehicle seat.

If the connection between the power screw 46 and the outer cross shaft 26 is as illustrated in Figure 1, it will be appreciated that power rotation of the outer cross shaft by the power means 78 will effect a slight horizontal movement of the vehicle seat. This resulting horizontal movement of the vehicle seat on vertical adjustment thereof is negligible and may, as previously suggested, be completely avoided by providing a rotary direct connection between the power screw 46 and the cross shaft 26.

Inasmuch as vertical upward movement of the seat when occupied may require considerable effort, helper springs 102 are provided. The forward ends of these springs are connected to cross pins 104 extending between the vertical webs of the elongated brackets 20. The rear ends of the springs 102 extend through openings provided in arms of the rear bell cranks 87, applying a clockwise torque thereto, as illustrated in Figures 2 and 3, which is effective to provide spring forces tending to raise the seat.

Where power means is provided to effect vertical and horizontal adjustment of the seat, and where this power means, as herein disclosed, includes worm and worm gear combinations, it is understood that de-energization of the adjusting motor effectively locks the seat in adjusted position due to irreversibility of the worm and worm gear connection.

Preferably, means are provided to facilitate independent rotation of the cross shafts 26 and 28. As illustrated herein, the internal diameter of the outer tubular cross shaft 26 is somewhat larger than the outside diameter of the internal cross shaft 28. However, the outer tubular cross shaft 26 is supported primarily on the internal cross shaft 28. As indicated at 110 the outer cross shaft is embossed inwardly at points near its end to provide abutment bearing surfaces of limited area which reduce the friction between the cross shafts while at the same time maintaining the inner cross shaft properly centered with respect to the outer cross shaft.

While the present construction as specifically illustrated herein includes an outer tubular cross shaft 26 within which the inner cross shaft 28 is received, this construction is not essential although highly desirable. The same operating functions could of course be obtained by providing laterally spaced cross shafts 26 and 28.

The drawings and the foregoing specification constitutes a description of the improved adjustable seat track assembly in such full, clear, concise and exact terms as to enable any person skilled in the art to practice the invention, the scope of which is indicated by the appended claims.

What I claim as my invention is:

1. Horizontally and vertically adjustable seat supporting structure comprising a pair of generally horizontal tracks, a pair of elongated slides on said tracks, said slides including elevated posts adjacent the ends thereof, a cross shaft extending between said slides and pivotally supported by a pair of posts on said slides, a second cross shaft of tubular shape extending over said first cross shaft and terminating short of the supported ends thereof, a first pair of seat supporting arms rigidly connected to the ends of one of said cross shafts, a second pair of seat supporting arms pivoted to the remaining pair of posts, a pair of equalizing arms rigidly connected to the end of said other shaft and links pivotally connecting the said equalizing arms to said tracks.

2. Horizontally and vertically adjustable seat supporting structure comprising a pair of generally horizontal tracks, a pair of elongated slides on said tracks, said slides including elevated posts adjacent the ends thereof, a cross shaft extending between said slides and pivotally supported by a pair of posts on said slides, a second cross shaft of tubular shape extending over said first cross shaft and terminating short of the supported ends thereof, a first pair of seat supporting arms rigidly connected to the ends of one of said cross shafts, a second pair of seat supporting arms pivoted to the remaining pair of posts, links connecting the corresponding ones of said first and second seat supporting arms, a pair of equalizing arms rigidly connected to the end of said other shaft, and links pivotally connecting the said equalizing arms to said tracks.

3. Adjustable seat supporting structure for a vehicle comprising a pair of longitudinally extending tracks, elongated longitudinally extending slides mounted for longitudinal movement on said tracks, said slides having posts at opposite ends, an outer tubular cross shaft and an inner cross shaft received in said outer tubular cross shaft, said shafts being carried for independent rotation by a pair of said posts in transverse alignment, lift arms fixedly secured to end portions of one of said cross shafts, lift arms pivotally mounted on the remaining pair of said posts, means on said lift arms for attachment to a seat construction, means for rotating said one cross shaft to raise and lower the seat construction, and linkage connecting end portions of said other cross shaft to fixed means in the vehicle to insure equal and simultaneous movement of said slides along said tracks.

4. Structure as defined in claim 3 in which said linkage comprises equalizer arms rigidly connected to said other cross shaft, and links having one end pivoted to said equalizer arms and the other end pivotally connected to said fixed means.

5. Structure as defined in claim 3 in which said inner cross shaft has an outer diameter less than the internal diameter of said outer tubular cross shaft, and one of said cross shafts has radial embossments centering it with respect to said other cross shaft.

6. Structure as defined in claim 5 in which said embossments extend inwardly adjacent the ends of said outer cross shaft.

7. Structure as defined in claim 3 in which the ends of said inner cross shaft are directly supported for rotation by said pair of posts in transverse alignment and said outer tubular cross shaft is rotatable on said inner cross shaft.

8. Structure as defined in claim 7 which comprises power means for moving both of said cross shafts parallel to said tracks, and separate power means for rotating the cross shaft having the said lift arms fixedly secured thereto.

9. Structure as defined in claim 3 comprising power means for moving said cross shafts forwardly or rearwardly parallel to said tracks, and additional power means carried by one of said slides for rotating said one cross shaft selectively in either direction.

10. Structure as defined in claim 3 comprising resilient counterbalance mechanism connected to one of said lift arms to counterbalance a portion of the load on the seat construction.

11. Adjustable seat supporting structure for a vehicle comprising a pair of longitudinally extending tracks, elongated longitudinally extending slides mounted for longitudinal movement on said tracks, an outer tubular cross shaft and an inner cross shaft received in said outer tubular cross shaft, said shafts being carried for independent rotation by corresponding end portions of said slides to extend transversely therebetween, lift arms fixedly secured to end portions of one of said cross shafts, lift arms pivotally mounted on the remaining end portions of said slides, means on said lift arms for attachment to a seat construction, means for rotating one cross shaft to raise and lower the seat construction, and linkage connecting end portions of said other cross shaft to fixed means in the vehicle to insure equal and simultaneous movement of said slides along said tracks.

12. Structure as defined in claim 11 comprising power slide actuating means comprising a motor, an elongated rigid actuating member movable longitudinally by said motor, means for mounting said member to extend between a fixed point and said outer cross shaft.

13. Structure as defined in claim 12 which comprises pivot means connecting said member to said outer cross shaft.

14. Structure as defined in claim 11 which comprises motor means for rotating said first cross shaft mounted on one of said slides.

15. Adjustable seat supporting structure for a vehicle comprising a pair of longitudinally extending tracks, elongated longitudinally extending slides mounted for longitudinal movement on said tracks, an inner cross shaft pivotally mounted in corresponding end portions of said slides to extend transversely therebetween, equalizer linkage connecting both end portions of said inner cross shaft to fixed means in the vehicle, an outer tubular cross shaft rotatably mounted on said inner cross shaft, lift arms fixedly secured to end portions of said outer cross shaft, lift arms pivotally mounted on the remaining end portions of said slides, linkage connecting the lift arms at the same side of said structure to insure simultaneous swinging of all of said lift arms.

16. Structure as defined in claim 15 comprising motor means connected between a stationary support and said outer tubular cross shaft operable to move said slides longitudinally of said tracks.

17. Structure as defined in claim 15 comprising a motor mounted on one of said slides for movement therewith, an actuating arm fixed to said outer tubular cross shaft, and drive means connecting said motor to said arm.

18. Structure as defined in claim 15 comprising motor means connected between a stationary support and said outer tubular cross shaft, pivot means connecting said motor means to said outer tubular cross shaft, said motor means being operable to move said slides longitudinally of said tracks.

19. Structure as defined in claim 15 comprising motor means connected between a stationary support and said outer tubular cross shaft, pivot means connecting said motor means to said outer tubular cross shaft, said motor means being operable to move said slides longitudinally of said tracks, a motor mounted on one of said slides for movement therewith, an actuating arm fixed to said outer tubular cross shaft, and drive means connecting said motor to said arm.

References Cited in the file of this patent

UNITED STATES PATENTS

| | | |
|---|---|---|
| 1,664,129 | Pallenberg | Mar. 27, 1928 |
| 2,129,952 | Lustig | Sept. 13, 1938 |
| 2,596,033 | King | May 6, 1952 |
| 2,609,029 | Haberstump | Sept. 2, 1952 |
| 2,631,649 | Rappl | Mar. 17, 1953 |
| 2,641,305 | Oishei | June 9, 1953 |